US007689701B2

(12) United States Patent
Hollingsworth (10) Patent No.: US 7,689,701 B2
(45) Date of Patent: Mar. 30, 2010

(54) DUAL-COMPONENT STATE TOKEN WITH STATE DATA DIRECT ACCESS INDEX FOR SYSTEMS WITH HIGH TRANSACTION VOLUME AND HIGH NUMBER OF UNEXPIRED TOKENS

(75) Inventor: James Lewis Hollingsworth, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/268,753

(22) Filed: Nov. 11, 2008

(65) Prior Publication Data

US 2009/0070416 A1    Mar. 12, 2009

Related U.S. Application Data

(63) Continuation of application No. 10/844,635, filed on May 13, 2004, now Pat. No. 7,512,693.

(51) Int. Cl.
*G06F 15/16* (2006.01)
*G06F 7/04* (2006.01)
(52) U.S. Cl. .................... 709/229; 709/223; 709/224; 709/225; 707/1; 707/10; 707/200

(58) Field of Classification Search ................ 709/229
See application file for complete search history.

(56) References Cited

U.S. PATENT DOCUMENTS

| 5,377,341 | A | * | 12/1994 | Kaneko et al. | ............... | 711/169 |
| 6,115,802 | A | * | 9/2000 | Tock et al. | .................. | 711/216 |
| 7,020,645 | B2 | * | 3/2006 | Bisbee et al. | .................. | 707/1 |
| 7,302,488 | B2 | * | 11/2007 | Mathew et al. | .............. | 709/229 |

* cited by examiner

*Primary Examiner*—Jeffrey Pwu
*Assistant Examiner*—Sulaiman Nooristany
(74) *Attorney, Agent, or Firm*—Robert H. Frantz; David A. Mims, Jr.; William H. Steinberg (57) ABSTRACT

Access to state data by a client process such as state data in an Online Transaction Processing arrangement is controlled through generation of and exchanging of a dual-component token. The first component of the token is an Index value which indirectly points to a block of state data assigned to process or user. The second component of the token is a sequence value, such as a Random Unique Sequence value, which is also associated with the block of state data for a process. With each transaction request, a user process provides the token to the OLTP server, which then verifies the sequence numbers of the state data and the token match before allowing access to the data.

17 Claims, 9 Drawing Sheets

*Prior Art*

DUAL-COMPONENT STATE TOKEN WITH STATE DATA DIRECT ACCESS INDEX FOR SYSTEMS WITH HIGH TRANSACTION VOLUME AND HIGH NUMBER OF UNEXPIRED TOKENS

CROSS-REFERENCE TO RELATED APPLICATIONS

Claiming Benefit Under 35 U.S.C. 120

This application is a continuation of U.S. patent application Ser. No. 10/844,635, filed on May 13, 2004, now U.S. Pat. No. 7,512,693, by James Lewis Hollingsworth, which is currently under allowance.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

The related patent application Ser. No. 10/844,635, filed on May 13, 2004, by James Lewis Hollingsworth, is hereby incorporated by reference in its entirety.

BACKGROUND OF THE INVENTION

1. Field of the Invention

This application is a continuation of U.S. patent application Ser. No. 10/844,635, filed on May 13, 2004, by James Lewis Hollingsworth, which is currently under allowance. This invention relates to state data management methods and systems for client-server and transaction processing computing arrangements.

2. Description of the Related Art

IBM originally developed Customer Information Control System ("CICS") to provide online transaction processing ("OLTP") programs for its mainframe computer systems. Today, together with COBOL programming language, a very large number of legacy applications still use the COBOL/CICS applications and environment to process transactions by accessing business data such as orders, inventory records and customer data.

CICS controls the interaction between application programs and the users of the system, and CICS allows programmers to develop screen displays without detailed knowledge of the terminals which will be used by the users. Using an application programming interface ("API"), developers can write programs to access business data in a database to maintain data integrity. In fact, current business application programs written in billions of COBOL lines facilitate more than 20 billion online transactions per day. Despite the attention in the computing industry being made to newer languages such as C++ and Sun Microsystems Java™, COBOL/CICS actually still has the largest installed base of applications. Therefore, it is still important for the CICS computing environment to be advanced to meet new customer requirements and needs.

The CICS products can reside on many types of operating systems such as OS/390 and UNIX, running on a wide variety of computing hardware platforms such as IBM's iSeries Enterprise servers or IBM-compatible Personal Computers. The latest IBM CICS Transaction Server for z/OS™, Version 2.3, offers an array of features and functionalities. It provides an efficient and effective environment for applications written in COBOL, PL/I, C, C++ and Java. This version strengthens application development capabilities, enables enhanced re-use of 3270 applications, and enables applications to be accessed as Web Services within a services oriented architecture ("SOA").

The CICS Transaction Server provides a robust, high performance environment for enterprise applications written in Java, as well as COBOL. In other words, it supports Enterprise Java Beans ("EJB") session beans that provide another dimension for application architects. Where an EJB component needs to incorporate procedural logic modules to accomplish its business function, CICS enables this mixed-language component to run in a single execution environment with good isolation from other components, improving robustness and manageability.

In addition, CICS allows for a run-time environment optimized for business logic written as EJBs that can run alongside, and interoperate with, business logic written in other languages such as COBOL. Both EJB and COBOL applications can access existing and new databases such as DB2, IMS™ and VSAM data, concurrently, and with complete integrity.

Furthermore, CICS Transaction Server contains enhancements for applications that use TCP/IP communication for e-business enablement. These offer a range of benefits in terms of management and improved scalability and performance. Enhancements such as DB2 facilities provide a significant improvement in performance and greater level of availability. In summary, CICS assists in the evolution to on-demand computing through integration, open architecture, autonomic computing and virtualization.

Figure 7:
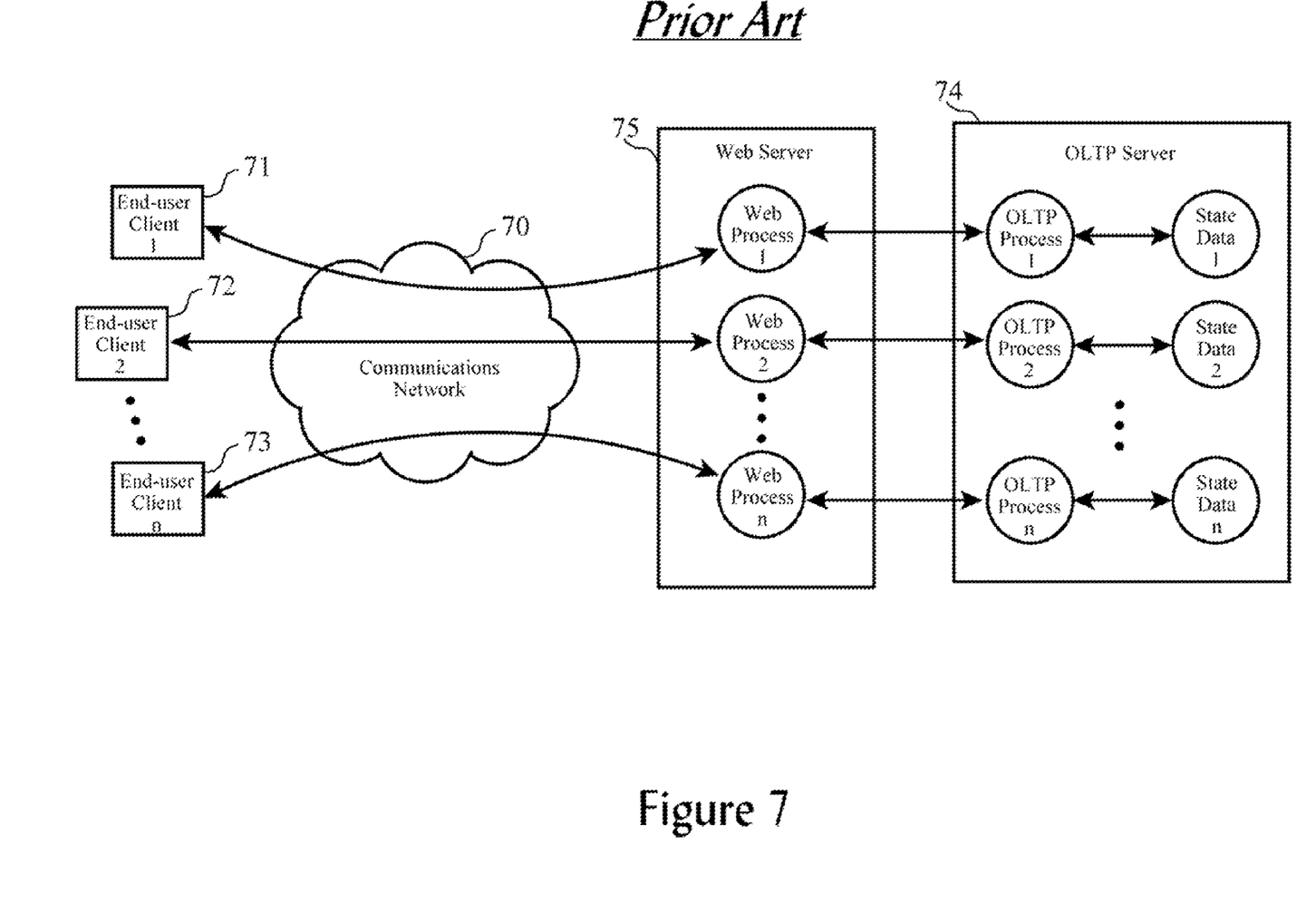
FIG. 7 provides and illustration of the well-known CICS environment and online transaction processes.

Turning to FIG. 7, a CICS environment and process is depicted in a general or high-level manner, which a number of client systems, consoles or terminals (71, 72, 73) are provided processing by an OLTP server (74) via a communications network (70) and a web server (75). Each OLTP process or instance of an OLTP process is associated with one or more state data blocks. State data blocks may store transaction data, session data, or combinations of the two. The associated web server blocks can provide some business logic, as well as user interface functions (e.g. forms, screens, etc.).

For example, a bank may have several teller consoles located throughout the bank. The teller consoles, which are the end-user clients (71, 72, 73) in this scenario, can be used to establish a new banking account for a new bank customer. In this example, a teller uses a console (71) to enter information into screens or forms, which drive an OLTP process to create the new bank account, entering information such as the customer's personal data (name, address, telephone number, etc.), and account options (e.g. checking, savings, investment, etc.). Forms and screens may be created and provided by the web server process associated with the teller console being used. The data, however, is stored in state data 1, which is associated with OLTP process 1 and web process 1. The information which the teller inputs is accumulated in the state data block. In this example, the OLTP process creates, or generates, a state data token that is associated with the state data. The state data token is passed to the client and is returned with subsequent requests from the client to assure that only the appropriate client device is allowed to use the state data associated with that client.

Although the existing technology, relating to state data token generation and state data management, fulfills much of online transaction processing needs in the industry, it does not handle high transaction volumes as effectively or efficiently as possible. In fact, current methods do not scale as well as possible with high transaction loads which adversely affects response time.

Contributing factors to poor scalability may be attributed to either instruction path length or I/O overhead in a state data access method, or the need for process or resource serialization.

Randomly generated tokens used as keys to access state data in an indexed data base require the data base to employ an index search algorithm and record update locking technique. The record locking technique is a form of resource serialization.

Methods employing state data chained in main memory require process serialization for token generation, state data access, and purging of expired state data.

For these reasons, there exists a need to provide a state data access control mechanism which exhibits improved scalability to handle a high volume of transactions in a system or OLTP environment such as CICS.

DESCRIPTION OF THE DRAWINGS

The following detailed description, when taken in conjunction with the figures presented herein, present a complete disclosure of the present invention.

SUMMARY OF THE INVENTION

Access to state data by a client process such as state data in an Online Transaction Processing arrangement is controlled through generation of and exchanging of a dual-component token.

The dual-component token structure contains a random unique sequence number and an index that provides direct access to the state data index array entry. The state data index array entry contains a pointer to the state data block in main memory.

Upon each transaction request, an end-user process returns a token to the OLTP server, preferably via a web server. Upon receipt of the returned token, the OLTP system verifies the sequence numbers of the state data block and the dual-component token match before allowing access to the state data.

Minimal process serialization is required to achieve the logical processes of the invention, thereby allowing improved scalability of the new process for larger volume OLTP environments.

According to one aspect of a preferred embodiment, the tokens are exchanged over a communications network in a displayable code format to avoid incorrect translation of the tokens by intermediary servers, operating systems or protocols which may otherwise incorrectly translate or modify a binary-format token.

According to other aspects of the invention, a separate process periodically performs automatic asynchronous purging of expired state data. Purged state data blocks are cleared and marked as available for re-use. An attempt to access an expired state data block before it has been purged by the asynchronous purge process results in an immediate purge of the state data block.

DETAILED DESCRIPTION OF THE INVENTION

Our new Dual-Component Token ("DCT"), in conjunction with the methods and systems for generating and using our DCTs, effectively provides a secure method for end-user client processes in an OLTP environment to access the proper state data blocks with its unique identifiers, while requiring minimal processing overhead, thereby allowing the method to be highly scalable in high volume OLTP environments.

Through use of randomized sequence values, predictability of our dual-component tokens is minimized, and avoids token duplications, either malicious or accidental. In addition, our state data access control method reduces access and response times. This combination of powerful aspects of our invention provides extensible scalability without regard to transaction volume or number of unexpired tokens.

Data Structures of the Invention

Figure 1:
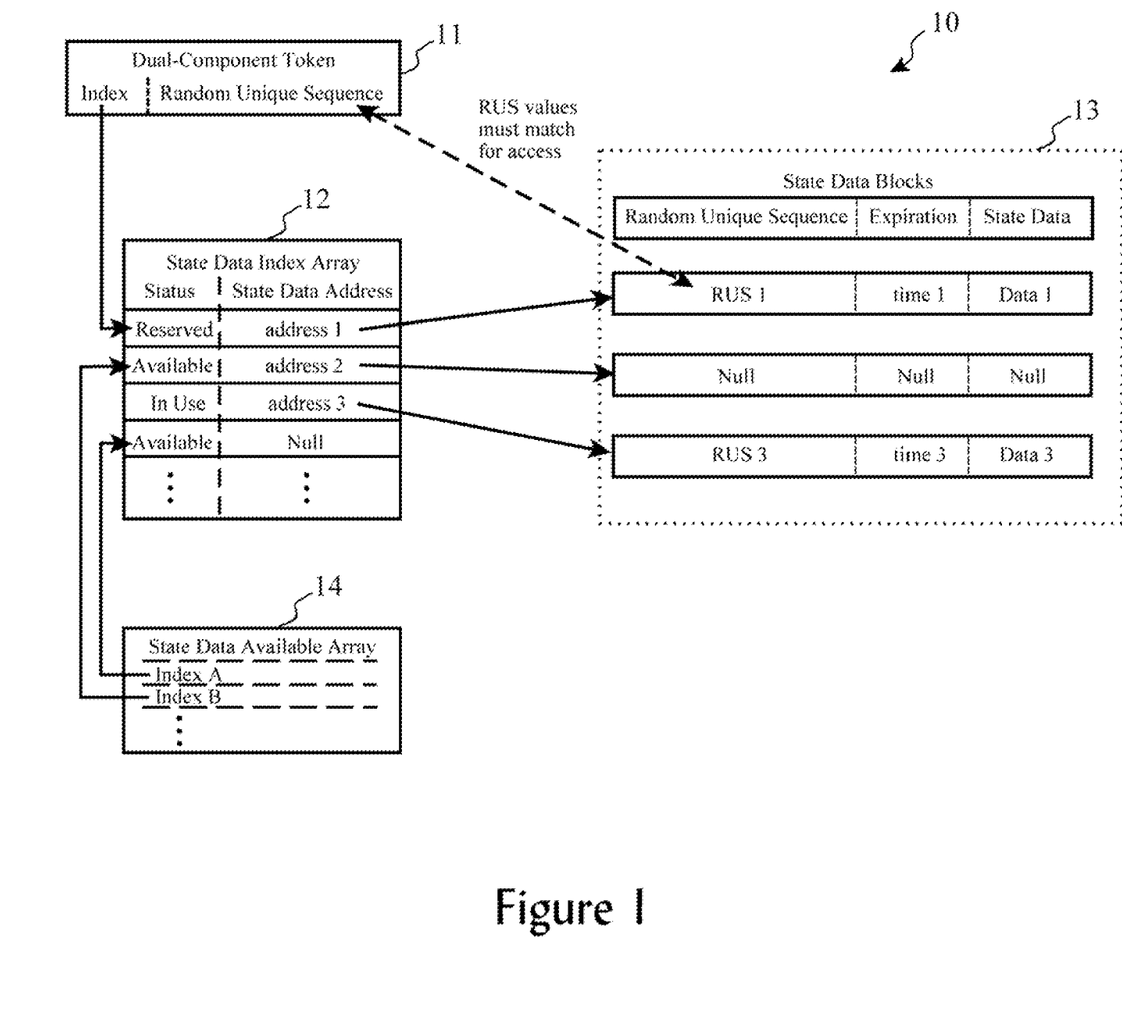
FIG. 1 illustrates the data structures according to the present invention.

Turning to FIG. 1, the diagram illustrates the preferred embodiments (10) of the various data structures according to our invention. The Dual-Component Token ("DCT") (11) comprises two components: (a) an Index, and (b) a Random Unique Sequence ("RUS") number. The Index element is used to directly index into our State Data Index array (12).

The RUS number is also distinctive across all generated tokens, both expired and unexpired, for a period of time, which is lengthened or shortened depending on transaction rate. The Random Unique Sequence ("RUS") can not be duplicated until after 16,777,215 have been generated, in the preferred embodiment. On the average it will be twice this number or 33,554,430. This might represent several days in a typical system.

Our State Data Index ("SDI") array entry (12) consists of two components, or fields, as well. First, it contains an address which points to a portion of memory, or State Data Block ("SDB") (13), each portion of memory storing the actual state data for a particular OLTP process (e.g. application program) or instance of an OLTP process. The address in the State Data Index array is typically set to a null value for a State Data Block which was previously released.

Second, our SDI (12) contains a status indicator for each of the State Data Blocks, having at least three possible conditions: "available," "in-use" and "reserved". A status of "available" indicates that the SBD to which it points is available for use by a new OLTP process or instance of a process to serve an end-user process' requests. The state data address may either point to a previously allocated State Data Block which was previously purged, or the address may be null.

A status of "in-use" indicates that a currently running OLTP process is using the SDB to which the address points. While the OLTP process is still running, the state data may not be purged, and is not available to another OLTP task or process.

A status of "reserved" indicates that our access control logic has reserved the SDB for a particular client process, and that it will remain reserved until it is explicitly released by an OLTP process associated with the particular client, or, until it expires. When the SDB's expiration time is reached before an OLTP process accesses the SDB again, the state data is preferably automatically purged, following which the status becomes "available." However, if the SDB is accessed again before its expiration time is reached, the status changes to "in-use" while the SDB is being accessed. If the Expiration time has been reached the state data is immediately purged, the state data block is cleared and the status is changed from "Reserved" to "Available".

Continuing with reference to FIG. 1, our State Data Available array ("SDA") (14) contains indices of available (e.g. unused or unallocated) entries in the SDI array. Each index value contained in the SDA (14) is an index to an entry in the SDI (12) which is available for use in a new DCT (11). When a new token is generated, an index value is selected and used from the SDA (14), and that selected index value is removed from the SDA (14) to avoid its re-use in another token. When a state data block is purged, the index for that DCT is recovered and placed back into the SDA (14) for use in another token some time in the future. These processes are described in more detail in the following paragraphs.

The State Data Block ("SDB") (13) comprises three parts for each block: (a) an RUS value, (b) an expiration time and/or date, and (c) the actual state data. The state data component of a SDB contains data to support a particular client's transactions and conversations with an OLTP process. Typically, an OLTP process ends after it transmits a response to the client. When the client transmits a subsequent request containing the state data token a new OLTP process is started or instanciated.

The RUS for the state data block is matched to the DCT token RUS which has been provided or assigned to the client which uses the state data. Generally speaking, when an end-user client processes needs to continue processing transactions on a particular block of state data, it submits a transaction request including a DCT which was originally provided to the client by the OLTP system. The token is passed from the client, through one or more web servers and intermediary servers, and eventually to the OLTP server.

Upon receipt by the OLTP server, the DCT is examined to determine if the RUS it contains matches the RUS stored in the SDB before access to the state data is allowed. A non-match may indicate that the SDB was previously used by a conversation whose expiration time has lapsed, and the state data has already been purged. Or, a non-match may indicate a fraudulent attempt to access state data for another end-user client. More details of this aspect of the invention are provided in the following paragraphs.

The expiration time for each state data block indicates the deadline beyond which state data can be or should be purged if no OLTP process has recently accessed or used the data. This allows the system to recover state data memory space when transaction processing is sufficiently old or stale.

Generation of Dual-Component Tokens

When an end-user client process submits an initial request for OLTP processing, a new Dual-Component Token is generated by the OLTP server, and an associated state data block is allocated. This new DCT is transmitted with the response to the requesting end-user client process such that the end-user client process can return it to the OLTP server with future processing requests.

Figure 2:
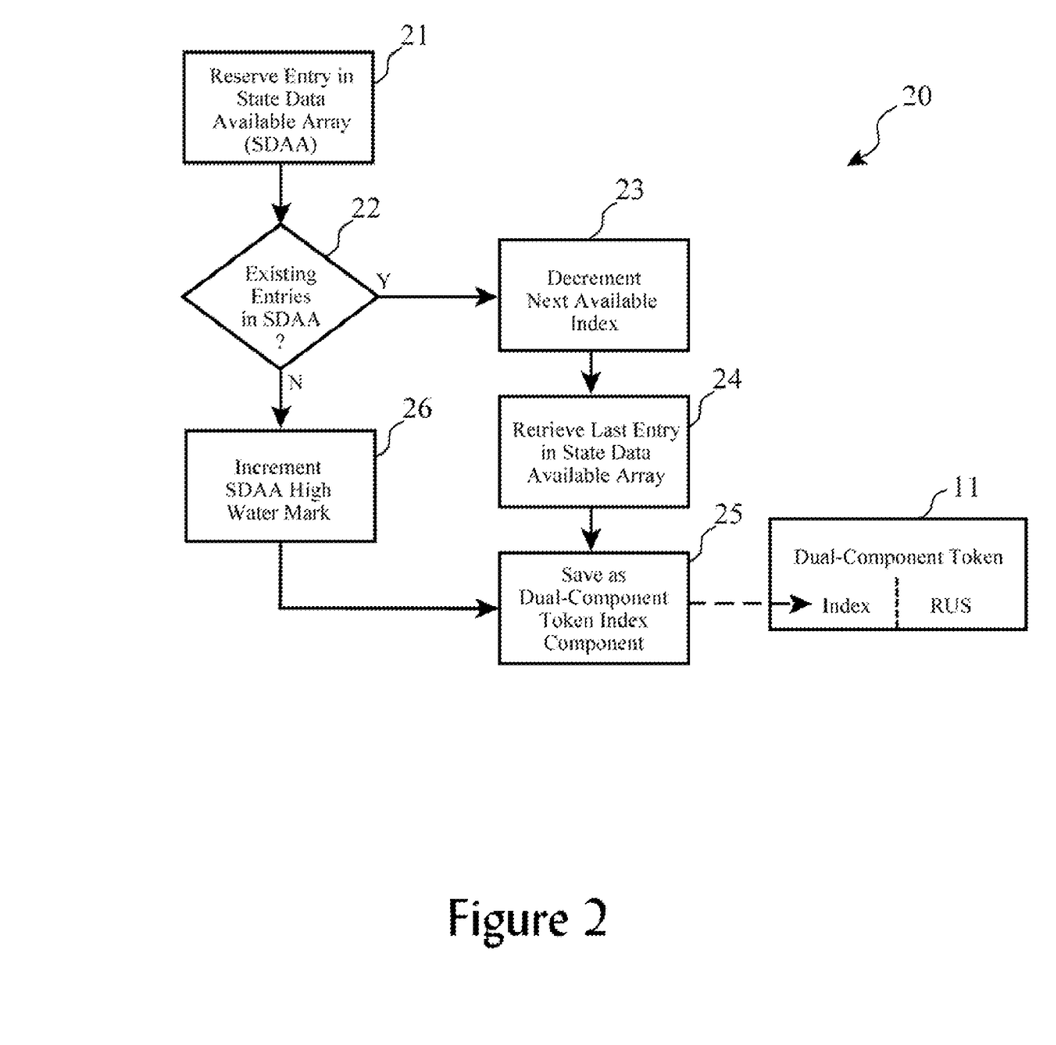
FIGS. 2, 3 and 4 depict the three phases, respectively, of generation of a new Dual-Component Token.
Figure 3:
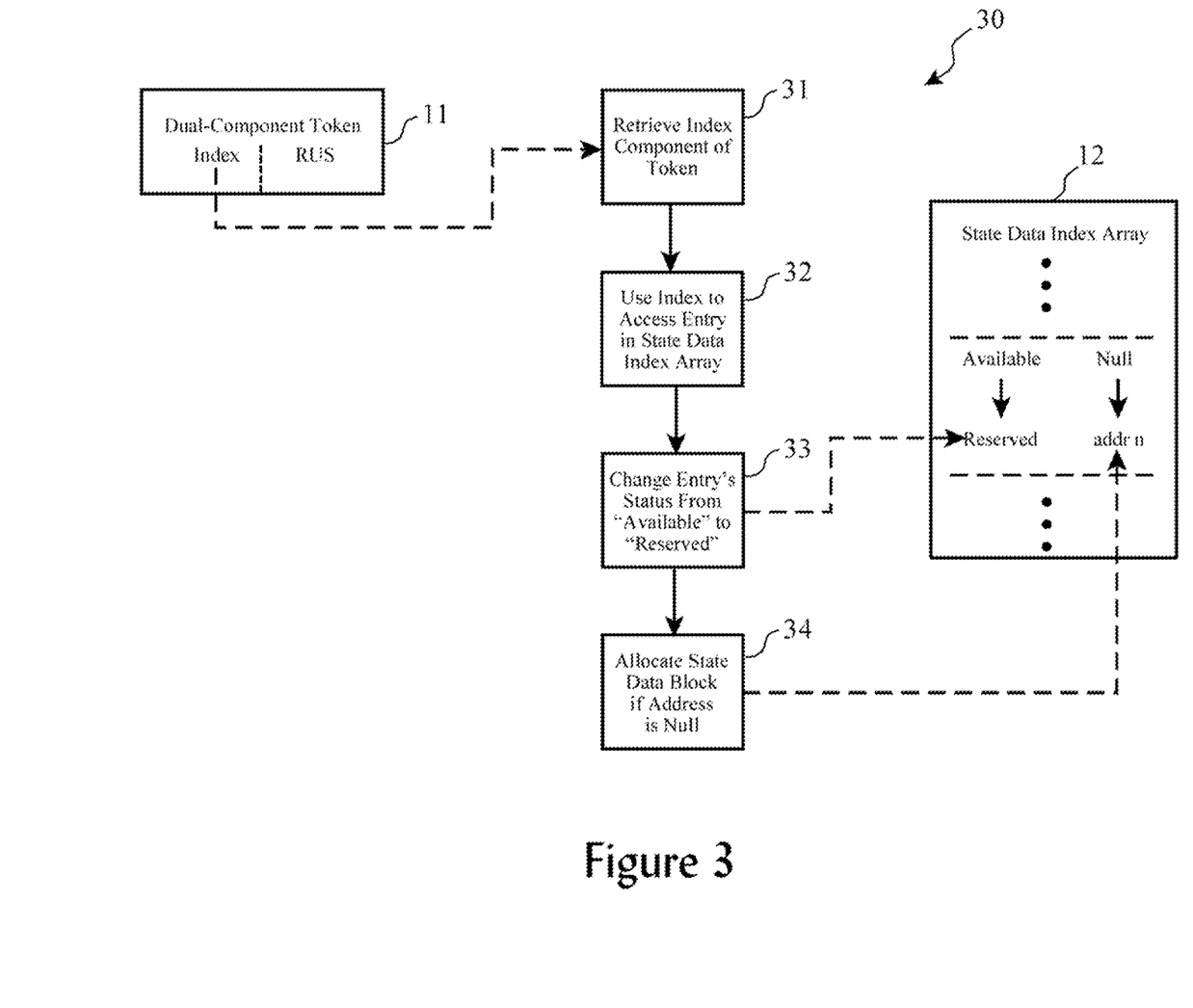
Figure 4:
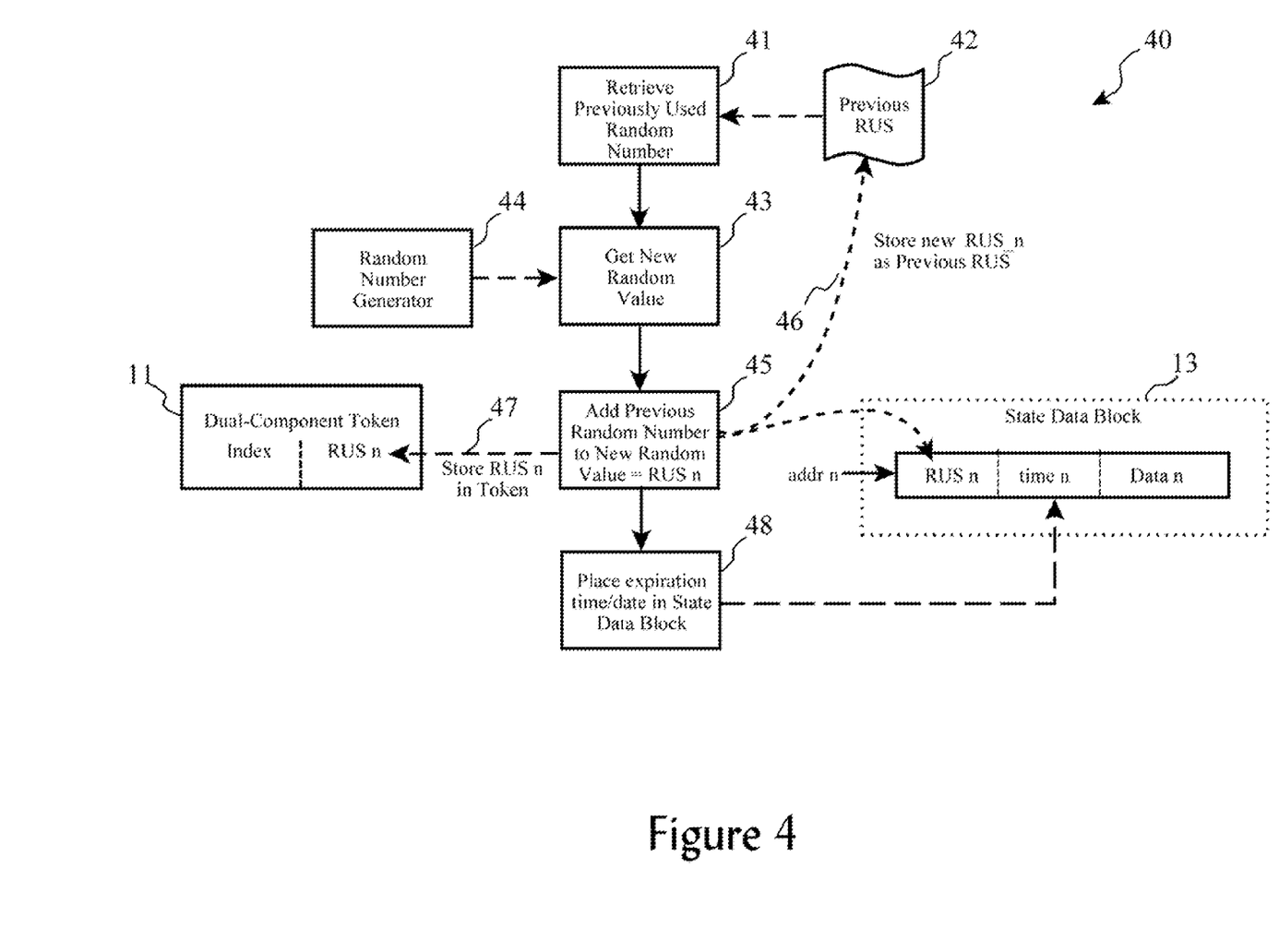

According to one aspect of the present invention, the generation of a new dual-component token comprises a three-phase process, the logic of which is illustrated in a general sense in FIGS. 2, 3 and 4. Referring first to FIGS. 1 and 2, an available index value from the SDA (14) is selected (21), preferably the last entry in the SDA. This selected index is used to reserve an entry in the SDI array (12), which in turn points (or will point) to a state data block (13).

If entries in the SDA array (22) already exist, a "Next Available Index" variable is decremented (23) by 1, the last entry in the SDA array (14) is retrieved (24) and saved as the new token Index component (25). The entry in the SDA array from which the Index was retrieved is set to 0, thereby removing that Index value from availability for use in other tokens.

If, however, no entries are available in the SDA array (22) (e.g. all Index values are currently in use), the SDI array "high water mark" variable is incremented (26) (e.g. to make room for an additional Index value, and that value is saved (25) as the Index value in the new DCT token (11). This Index component insures that each token across all unexpired tokens is unique.

It is worth noting that in a multi-processor environment, process serialization may be required to prevent multiple OLTP tasks, running on different processors, from updating either the Next Available Index, the State Data Index array high water mark, and/or the Random Unique Sequence (described later) values at the same time. In such an environment, process serialization is only required around the instructions used to decrement the Next Available Index, to increment the State Data Index array High Water Mark, or to increment the Random Unique Sequence value. In many programming languages, each of these operations can be accomplished with a single instruction, and as such, serialization of these individual instructions do not significantly detract from scalability or load capacity of the OLTP system. However, because IBM's CICS dispatches application tasks whose programs are defined with COncurrency (quasirent) on the single Quasi-Reentrant (QR) TCB, ENQ serialization should not be necessary as long as no CICS API commands are coded between serialization points.

In the second phase of logic, as shown in FIG. 3, the saved Index component of the DCT (11) being generated is retrieved (31) and used to directly access the SDI array (12) entry to which it points. The status of the indicated entry in the SDI array (12) is changed from "Available" to "Reserved". If the State Data address is null or there were no entries in the SDA array (14), a state data block is allocated and the address is placed in the SDI array entry (12). This completes the SDI array entry reservation process. In the third phase of token generation as shown in FIG. 4, the logic of the invention (40) generates a Random Unique Sequence ("RUS") value for the new DCT token. The logic retrieves (41) the last used RUS value (42) (e.g. the RUS value of the most recently created DCT token), and obtains a new, non-zero random value (43) from a random number generator (44). The new random value is used to modify (45) the previously used RUS value, such as by adding the two values to each other, to generate a new random value which is by definition not the same as the previous RUS value (42) (e.g. because it has been modified using a non-zero random value). Finally, according to our preferred embodiment, an expiration date and/or time is stored (48) in the State Data Block (13).

There are three methods employed to insure that the RUS component is not predictable, according to our preferred embodiment. First, when the system is initialized the initial RUS component is seeded with a sufficiently large (e.g. 8-byte) random binary value. Second, for each new token, a random value is added to the preceding RUS, so that a new random value is used for each new token generated. Third, the newly generated RUS is preferably scrambled using a factorial 4 algorithm before being exposed for external use.

This insures a unique token across all generated tokens, both expired and unexpired, over a reasonable amount of time depending on transaction rate. The RUS cannot be duplicated until after 16,777,215 have been generated, according to a preferred embodiment, even though typically it will be twice this number or 33,554,430. This might represent several days in a typical OLTP system. Assuming a high water mark of 10,000 concurrent unexpired tokens, there will be only a 1 in 2,560,000 probability of a newly generated token matching an expired token that was generated over 16,777,215 tokens ago. Therefore, duplication is minimized and exclusivity is achieved.

This new RUS value becomes the RUS value for the new DCT token (e.g. it is stored (47) in the DCT (11) being created), it is saved (46) as the previous RUS (42) (e.g. to avoid re-using the RUS value in the next DCT token), and it is stored in the corresponding State Data Block (13) which has been allocated to the OLTP process to which the new DCT will be assigned. The expiration time is also placed in the State Data block at this time.

At this point, following these three phases, the generation of a new Dual-Component Token is complete, including an Index value and a Random Unique Sequence value, and the appropriate data structures are complete such as that the Index can be used to access an allocated state data block. Further, the allocated state data block has been created so as to include the RUS which can be used during future access attempts to verify authorization by a client or process to access the data (as described in the following paragraphs).

It will be recognized by those skilled in the art that these three phases may be performed in different orders, and with varying details of implementation, so as to achieve the same products (e.g. achieve the described DCT token and data structures), without departing from the spirit and scope of the present invention.

Prior to providing this new DCT token to a client device, it is preferably converted to a displayable data format, such as a 16-character display format from an 8-character binary format, for reasons described in more detail in the following paragraphs.

State Data Access Process

During transaction processing on behalf of a client device, the DCT token is employed to restrict access to state data stored by the server to only the client to whom the state data belongs (e.g. more precisely, to the OLTP process and instance of process which is being executed on behalf of the specific client).

Figure 5:
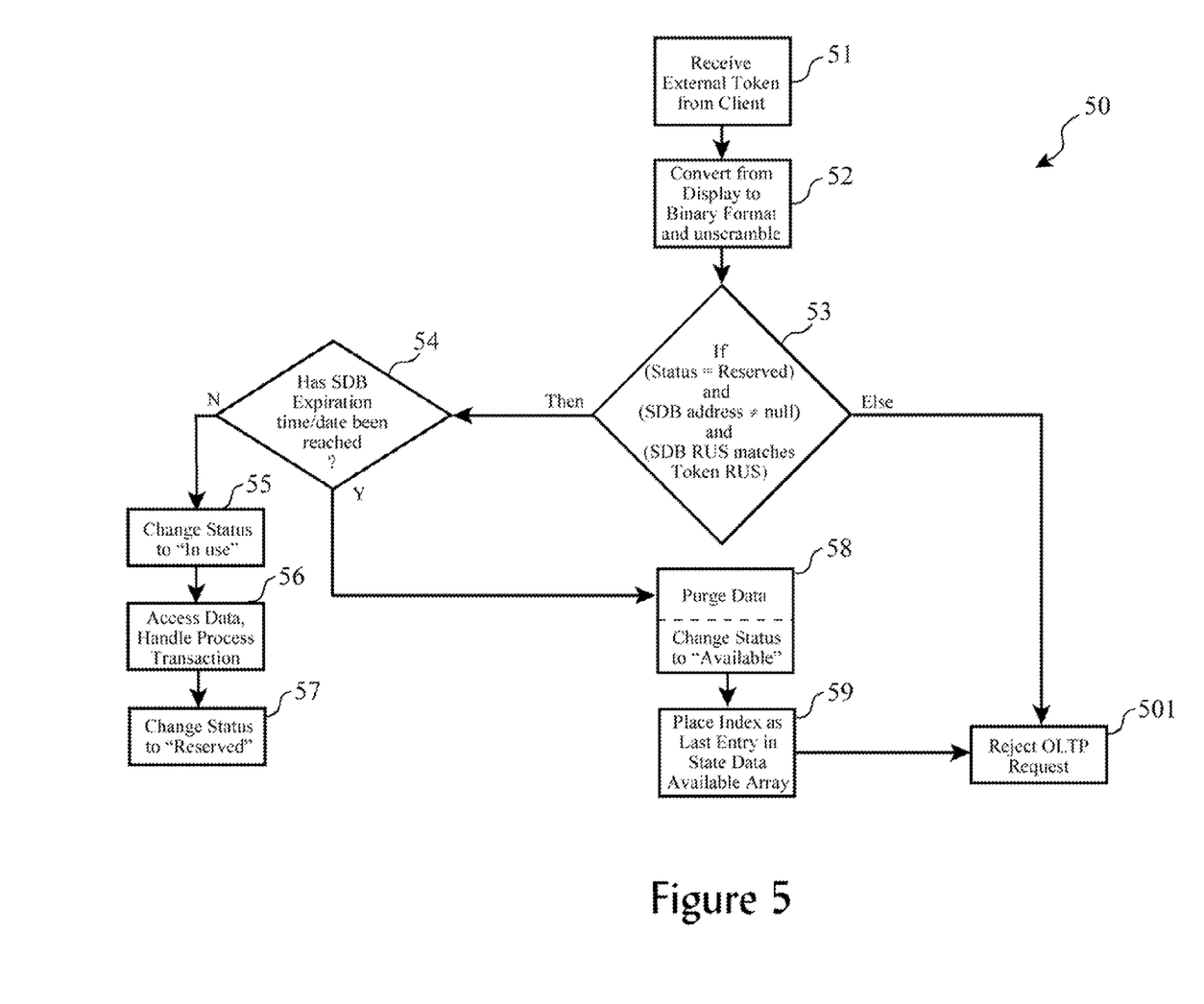
FIG. 5 illustrates our logical process for restoring state data.

According to another aspect of our invention, the logical processes (50) employed to access state data consists of restore and save processing, as depicted in a general sense in FIG. 5.

Restore Data Processing Using Dual-Component Tokens

A multi-step process is preferably used in our state data Restore logic, as shown in FIG. 5. A DCT token received (51) from a client associated with a processing request.

This should be the same token which was supplied to the client by the OLTP when the session or transaction was started According to our preferred embodiment, the DCT is converted from a 16-character display format to an 8-character binary format using a modulo-26 algorithm and the Random Unique Sequence from the token is unscrambled using a factorial 4 algorithm (52). As previously mentioned in this disclosure regarding DCT generation, our preferred embodiment provides for the exchange of DCT tokens in a converted, "displayable" data format. There is a potential data translation problem for information which is transmitted across computing platforms having a variety of file systems and operating systems. For example, if the DCT were exchanged between the end-user client and the OLTP server as a binary value then any translation process would have know where the DCT was located in the message in order to leave the DCT untranslated, thus preserving the DCT value. Other business data in displayable format would be translated from one codepage to another (e.g. from ASCII to EBCDIC). By converting the DCT to a displayable value ASCII to EBCDIC translation may be performed on the message without regard to special handling of the DCT.

Next, the Index component of the DCT token is used to check the corresponding entry in the SDI (12). If (53) the status of the entry in the SDI is not "reserved", or if the address in the SDI entry is "null", or if the State Data RUS does not match the token RUS, then the access is denied (501).

Otherwise (54), the SDB (13) is accessed according to the address in the indicated SDI entry, and if the state data is expired, this DCT token is not a valid token for the SDB (e.g. fraudulent attempt to access the state data is being made), so the access request is rejected (501).

Otherwise (54), the expiration time is checked in the SDB (13). If it has expired the state data is immediately purged (58) by clearing the state data block, changing the status to "available", and placing the index as the last entry (59) in the SDA (14) array.

If Expiration time remains and the RUS values match, then access to the state data proceeds by altering the status of the SDB in the SDI from "Reserved" to "In-Use" (55), and allowing the state data to be accessed (56) (e.g. read or modified). When access to the state data is completed, the status of the SDB is returned to "reserved" (57).

Preferably, expired state data is also purged by a state data purge task that is timer-triggered to run periodically. This "housekeeping" task takes care of purging expired state data when a client has not attempted access that would have caused an immediate state data purge as described above. The state data purge by the "housekeeping" task is performed by setting the status to "Available", and the Index is placed as the last entry in the SDA array, as described in the following paragraphs.

Save Data Processing Using Dual-Component Tokens

Figure 6:
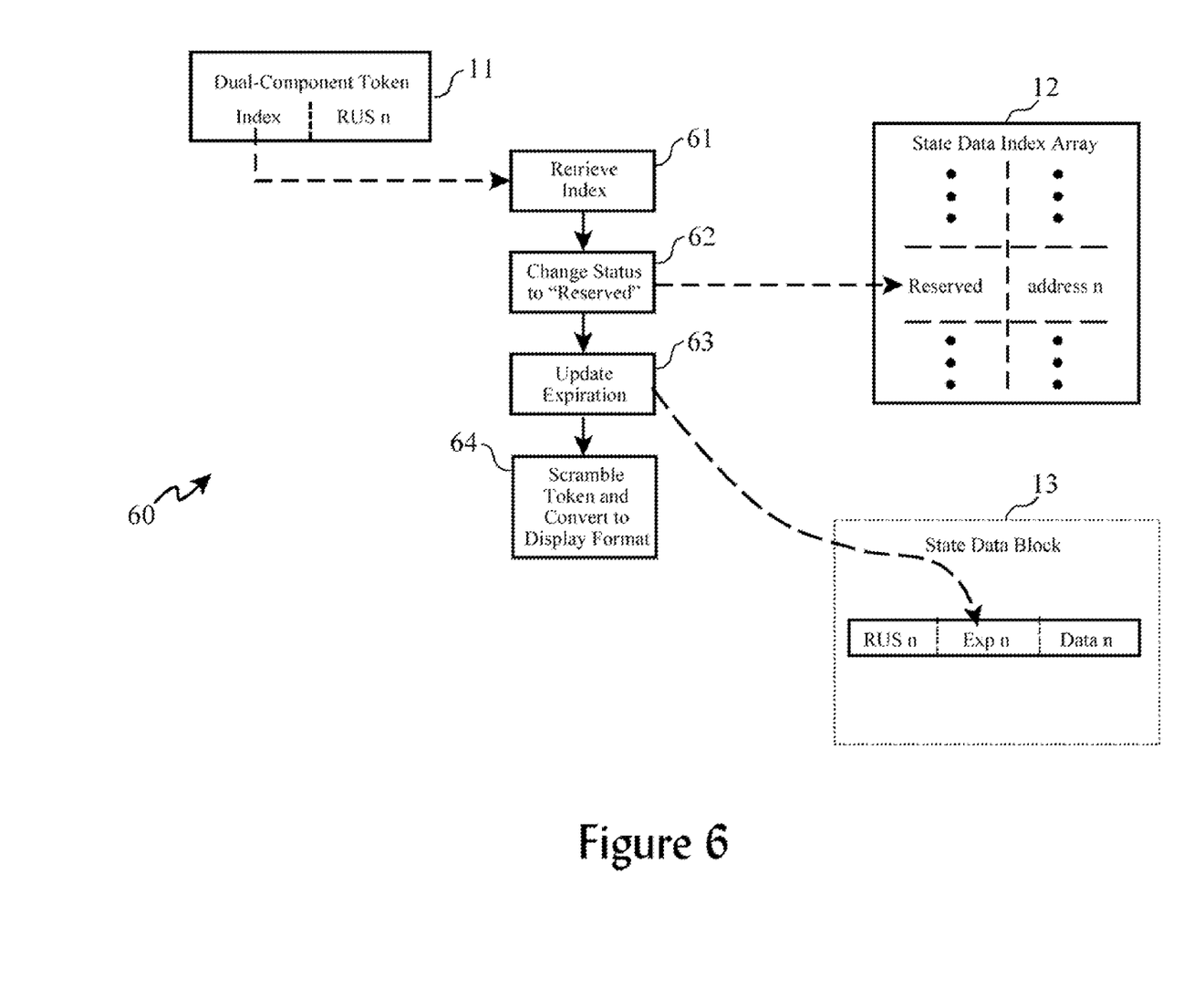
FIG. 6 illustrates our logical process for saving data.

Our state data "Save" function, as shown in FIG. 6, is also a multi-step process similar to the Restore process. The Index component is retrieved (61) from the DCT token, and used to directly access the SDI array entry, where the status of the entry is changed (62) from "In Use" to "Reserved". Next, the SDB is addressed (using the address from the entry in the SDI array), and the expiration timer is set (63). Finally, the RUS portion of the token is scrambled, preferably using a factorial 4 algorithm (64), and the binary format is converted to a display format, preferably from an 8-character binary format to a 16-character display format using a modulo-26 algorithm. The display formatted token will be the external token sent back to the client.

State Data Asynchronous Expiration Purge Process

According to another aspect of the preferred embodiment, and as previously mentioned, expired SDB data is preferably automatically purged, and the state data block recovered, asynchronous to any access requests. Occasionally or periodically, the SDI array is browsed from beginning to end. This browse only considers entries that have a "Reserved" status (62). Then, the expiration time of each "reserved" SDB is checked against the current system time and/or date. If the expiration time within an SDB has been reached or passed, then the state data is immediately purged, the status is changed from "Reserved" to "Available", and the corresponding Index is placed as the last entry in the SDA array to be re-used in a new DCT token.

Realization of the Invention as Electronic Circuitry

The present invention may be realized in part or in its entirety as electronic circuitry, such as in a Application Specific Integrated Circuit. In such a realization, some of the logical steps described in the foregoing paragraphs may be performed simultaneously, rather than sequentially, as is possible in logic circuits. Therefore, the steps and processes described may not, in some implementations, be implemented in the sequence or serially as described, but which is within the scope of the present invention, nonetheless.

Realization of the Invention as Software

The present invention may also be realized, in part or whole, as a feature or addition to the software already found present on well-known computing platforms, such as personal computers, web servers, and web browsers, and such as the IBM CICS software environment.

These common computing platforms can potentially include portable computing platforms, such as personal digital assistants ("PDA"), web-enabled wireless telephones, and other types of personal information management ("PIM") devices, provided they have the necessary computational bandwidth, memory, and communications capabilities.

Therefore, it is useful to review a generalized architecture of a computing platform which may span the range of implementation, from a high-end web or enterprise server platform, to a personal computer, to a portable PDA or web-enabled wireless phone.

Figure 8:
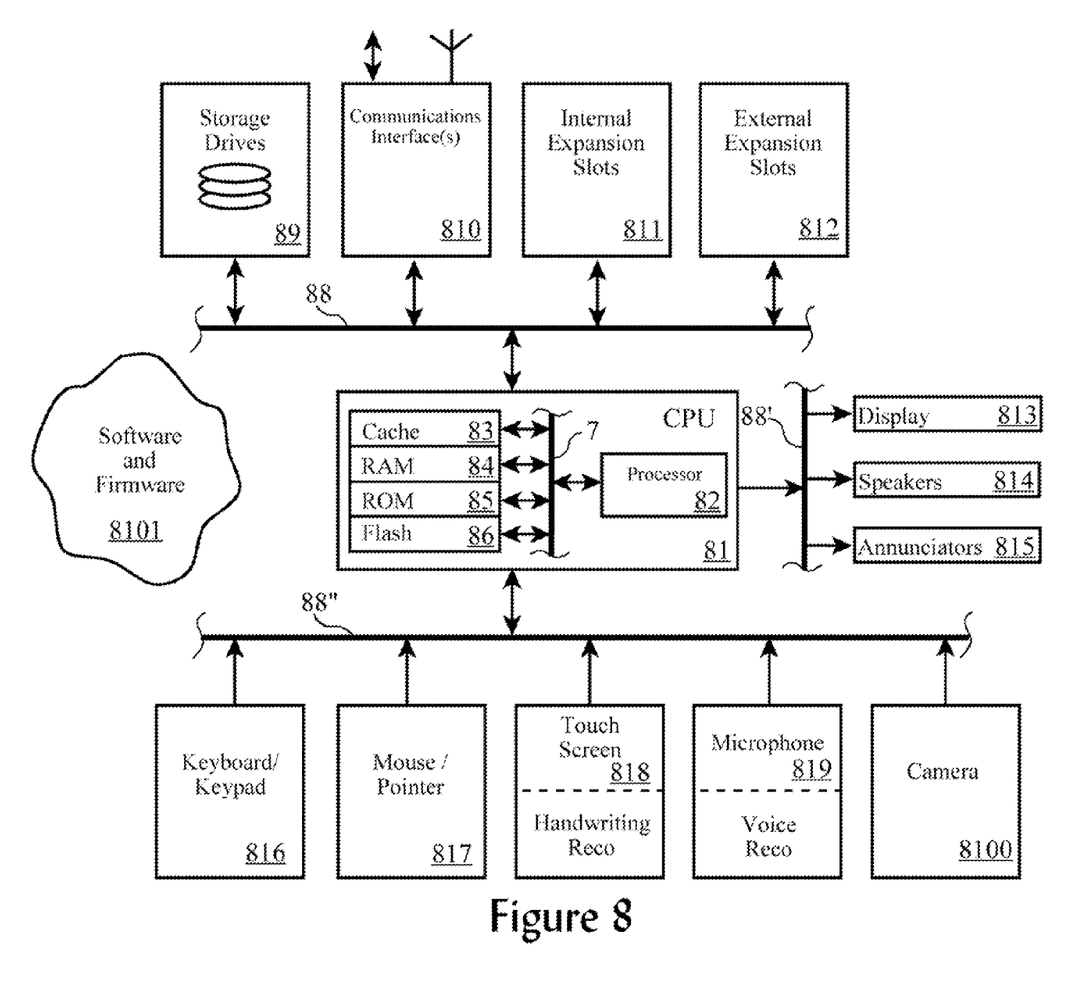
FIG. 8 depicts a generalized computing platform architecture, such as a personal computer, server computer, personal digital assistant, web-enabled wireless telephone, or other processor-based device, suitable for employ in the realization of the present invention.

Turning to FIG. 8, a generalized architecture is presented including a central processing unit (81) ("CPU"), which is typically comprised of a microprocessor (82) associated with random access memory ("RAM") (84) and read-only memory ("ROM") (85). Often, the CPU (81) is also provided with cache memory (83) and programmable FlashROM (86). The interface (87) between the microprocessor (82) and the various types of CPU memory is often referred to as a "local bus", but also may be a more generic or industry standard bus.

Many computing platforms are also provided with one or more storage drives (89), such as a hard-disk drives ("HDD"), floppy disk drives, compact disc drives (CD, CD-R, CD-RW, DVD, DVD-R, etc.), and proprietary disk and tape drives (e.g., Tomega Zip™ and Jaz™, Addonics SuperDisk™, etc.). Additionally, some storage drives may be accessible over a computer network.

Many computing platforms are provided with one or more communication interfaces (810), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (812) allowing the user the ability to easily install and remove hardware expansion devices, such as PCMCIA cards, SmartMedia cards, and various proprietary modules such as removable hard drives, CD drives, and floppy drives.

Often, the storage drives (89), communication interfaces (810), internal expansion slots (811) and external expansion slots (812) are interconnected with the CPU (81) via a standard or industry open bus architecture (88), such as ISA, EISA, or PCI. In many cases, the bus (88) may be of a proprietary design.

A computing platform is usually provided with one or more user input devices, such as a keyboard or a keypad (816), and mouse or pointer device (817), and/or a touch-screen display (818). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (818) is usually provided, often with handwriting recognition capabilities.

Additionally, a microphone (819), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (813), are also provided with most computing platforms. The display (813) may take many forms, including a Cathode Ray Tube ("CRT"), a Thin Flat Transistor ("TFT") array, or a simple set of light emitting diodes ("LED") or liquid crystal display ("LCD") indicators.

One or more speakers (814) and/or annunciators (815) are often associated with computing platforms, too. The speakers (814) may be used to reproduce audio and music, such as the speaker of a wireless telephone or the speakers of a personal computer. Annunciators (815) may take the form of simple beep emitters or buzzers, commonly found on certain devices such as PDAs and PIMs.

These user input and output devices may be directly interconnected (88', 88") to the CPU (81) via a proprietary bus structure and/or interfaces, or they may be interconnected through one or more industry open buses such as ISA, EISA, PCI, etc. The computing platform is also provided with one or more software and firmware (8101) programs to implement the desired functionality of the computing platforms.

Figure 9:
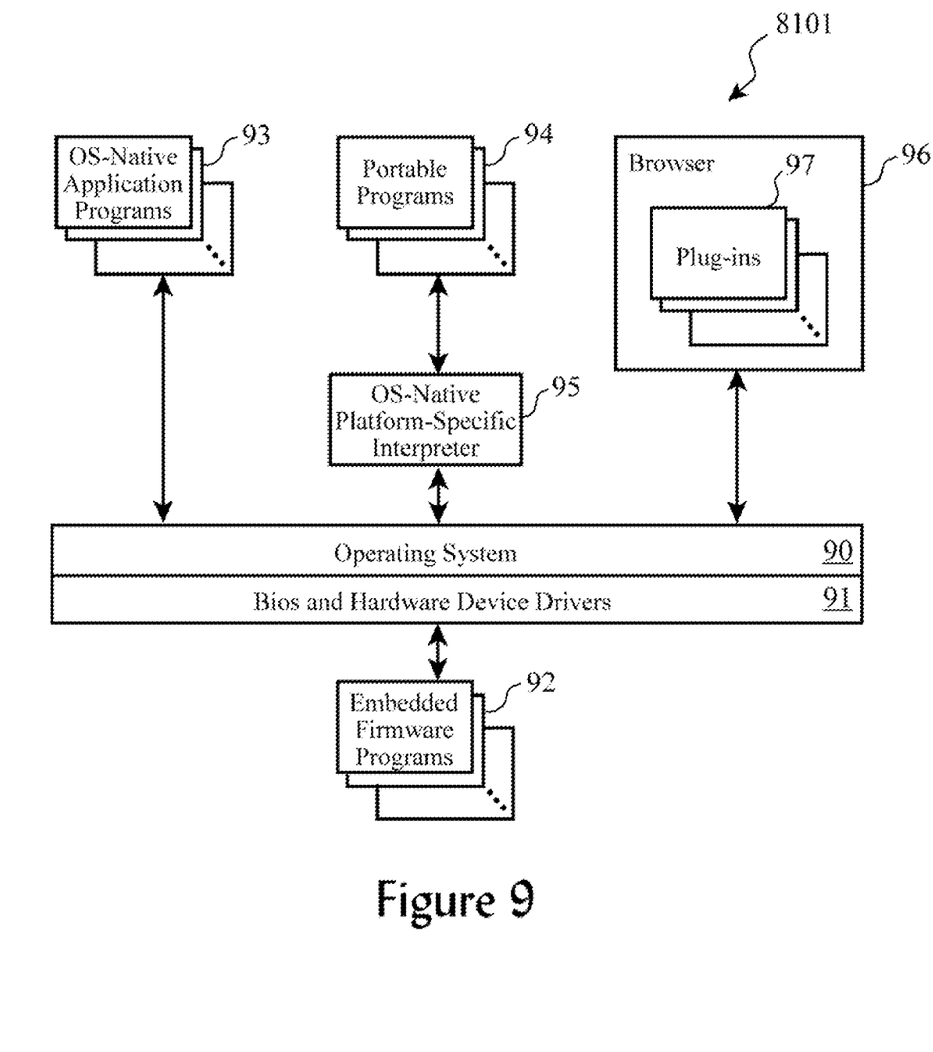
FIG. 9 shows a generalized organization of software and firmware associated with the generalized architecture of FIG. 8.

Turning to now FIG. 9, more detail is given of a generalized organization of software and firmware (8101) on this range of computing platforms. One or more operating system ("OS") native application programs (93) may be provided on the computing platform, such as word processors, spreadsheets, contact management utilities, address book, calendar, email client, presentation, financial and bookkeeping programs.

Additionally, one or more "portable" or device-independent programs (94) may be provided, which must be interpreted by an OS-native platform-specific interpreter (95), such as Java™ scripts and programs.

Often, computing platforms are also provided with a form of web browser or micro-browser (96), which may also include one or more extensions to the browser such as browser plug-ins (97).

The computing device is often provided with an operating system (90), such as Microsoft Windows™, UNIX, IBM OS/390, OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (91) are often provided to allow the operating system (90) and programs to interface to and control the specific hardware functions provided with the computing platform.

Additionally, one or more embedded firmware programs (92) are commonly provided with many computing platforms, which are executed by onboard or "embedded" microprocessors as part of the peripheral device, such as a micro controller or a hard drive, a communication processor, network interface card, or sound or graphics card.

As such, FIGS. 8 and 9 describe in a general sense the various hardware components, software and firmware programs of a wide variety of computing platforms, suitable for realization of the present invention.

CONCLUSION

While many details of preferred and optional embodiments have been disclosed in order to illustrate the present invention, it will be recognized by those skilled in the art that certain variations and modifications from the disclosed examples may be made without departing from the spirit and scope of the present invention. Therefore, the scope of the invention should be determined by the following claims.

What is claimed is:

1. An On Line Transaction Processing process state data access manager system comprising:
    an On Line Transaction Processing (OLTP) server portion of a computing platform, said portion including a processor and computer memory configured to perform one or processes;
    a dual-component token generator portion of said server configured to generate a dual-component access token, said token comprising at least a non-randomized index value and a randomized sequence value;
    an exchange mechanism portion of said server configured to exchange said dual-component token between OLTP user of OLTP transaction state data and a repository for said OLTP transaction state data, said dual-component token being provided by said generator to said user of transaction state data, and said dual-component token being provided to said repository in association with an OLTP request for access to said OLTP transaction state data;
    a repository access controller portion of said server configured to receive said OLTP request for access to said OLTP transaction state data, to examine said dual-component access token, and to securely allow access by said OLTP user to said OLTP transaction state data based upon said index value and said sequence value, wherein said sequence value is utilized for secure uniqueness and non-predictability of the token, and wherein said index value is utilized to directly locate said OLTP transaction state data without need for a search process to resume or continue processing of a transaction from a previous transaction state.

2. The process state data access manager system as set forth in claim 1 further comprising a State Data Index array having one or more entries, each entry comprising a status indicator and an address value, said address value pointing to a block of data for a State Data Block, and wherein said dual-component token comprises an index value associated correlating to an entry in a State Data Index array.

3. The process state data access manager system as set forth in claim 2 wherein said status indicator comprises a status indication selected from the group of "reserved", "available", and "in use".

4. The process state data access manager system as set forth in claim 2 further comprising a State Data Available array configured to store one or more index values associated with entries in said State Data Index array which are available for assignment to a user.

5. The process state data access manager system as set forth in claim 1 wherein said sequence value comprises a sequence value which is pseudo-random in nature.

6. The process state data access manager system as set forth in claim 5 wherein said pseudo-random sequence value is produced by modifying a previously used sequence value with a random value.

7. The process state data access manager system as set forth in claim 1 wherein said exchange mechanism is further configured to transmit, receive, and convert said dual-component tokens such that each token is exchanged in a computer displayable format.

8. The process state data access manager system as set forth in claim 7 wherein said displayable format comprises a text encoding format.

9. The process state data access manager system as set forth in claim 1 wherein said repository access controller is further configured to compare a sequence value associated with a block of state data and a sequence value received from a user, and to allow access to said state data only upon a match of said sequence values.

10. The process state data access manager system as set forth in claim 9 wherein said repository access controller is further configured to, responsive to determination that said sequence values do not match, deny access by said user to said state data, purge said state data, and change a status indicator to "available" in a State Data Index array associated with said state data.

11. The process state data access manager system as set forth in claim 1 wherein said repository access controller is further configured to deny access by a user to state data responsive to receiving a request for access to state data which is indicated as being "in use" or "available" in a State Data Index array.

12. The process state data access manager system as set forth in claim 1 wherein said repository access controller is further configured to periodically check an expiration indicator for a block of state data, and responsive to a system time or system date meeting or exceeding said expiration, purging said state data block, and changing a status indicator of said purged state data block to "available".

13. A computer program and data storage device comprising:
    a computer-readable storage device selected from a group comprising a computer memory and a computer disk; and one or more programs encoded by said computer-readable storage device configured to:
    initially generate a dual-component token upon allocation of a block of On Line Transaction Processing (OLTP) transaction state data to an OLTP process, said token comprising at least a non-randomized index component value and a randomized sequence component value;
    associate said sequence value with said allocated block of OLTP transaction state data in a repository;
    provide said token to an OLTP process;
    receive a request from an OLTP client for access to said OLTP transaction state data, said request including a dual-component token;
    verify the sequence value contained in said received token against the sequence value associated with an indicated block of OLTP transaction state data in said repository, said indicated block of OLTP transaction state data being determined in part by said Index component of the received token; and
    allow access to said OLTP transaction state data responsive to finding a match between said sequence values, wherein said sequence value is utilized for secure uniqueness and non-predictability of the token, and wherein said index value is utilized to directly locate said OLTP transaction state data without need for a search process to resume or continue processing of a transaction from a previous transaction state.

14. The program and data storage device as set forth in claim 13 further comprising a State Data Available array containing one or more Index values which point to entries in said State Data Index array corresponding to available, unowned state data blocks.

15. The program and data storage device as set forth in claim 13 wherein said dual-component token is encoded into a displayable format for exchange between a state data repository and a user of said state data.

16. The program and data storage device as set forth in claim 15 wherein said displayable format is a text encoding format.

17. The program and data storage device as set forth in claim 13 wherein said status indicators are selected from the group of "available", "in use" and "reserved".

* * * * *